United States Patent
Ling

(10) Patent No.: US 12,235,381 B2
(45) Date of Patent: *Feb. 25, 2025

(54) PHASED ARRAY AUTOMOTIVE RADAR

(71) Applicant: MAXLINEAR, INC., Carlsbad, CA (US)

(72) Inventor: Curtis Ling, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,282

(22) Filed: Feb. 21, 2023

(65) Prior Publication Data

US 2023/0280445 A1 Sep. 7, 2023

Related U.S. Application Data

(63) Continuation of application No. 16/372,600, filed on Apr. 2, 2019, now Pat. No. 11,585,890.

(60) Provisional application No. 62/651,357, filed on Apr. 2, 2018.

(51) Int. Cl.
*G01S 7/03* (2006.01)
*G01S 13/931* (2020.01)

(52) U.S. Cl.
CPC ............ *G01S 7/032* (2013.01); *G01S 13/931* (2013.01)

(58) Field of Classification Search
CPC ................................ G01S 7/032; G01S 13/931
See application file for complete search history.

(56) References Cited

U.S. PATENT DOCUMENTS

| 5,008,678 A | 4/1991 | Herman |
| 5,115,245 A | 5/1992 | Wen et al. |
| 5,206,655 A | 4/1993 | Caille et al. |
| 5,495,255 A | 2/1996 | Komatsu et al. |
| 5,657,021 A | 8/1997 | Ehsani-Nategh et al. |
| 5,724,042 A | 3/1998 | Komatsu et al. |
| 5,999,092 A * | 12/1999 | Smith ............. G01S 13/931 340/436 |
| 6,130,640 A * | 10/2000 | Uematsu ............ G01S 7/032 342/175 |
| 6,759,986 B1 | 7/2004 | Saliga et al. |

(Continued)

FOREIGN PATENT DOCUMENTS

| EP | 0733913 A2 * | 9/1996 | ............ G01S 13/931 |
| EP | 1610147 A1 * | 12/2005 | ............ G01S 7/032 |

OTHER PUBLICATIONS

A. J. Fenn et al, "The Development of Phased-Array Radar Technology"; Lincoln Laboratory Journal; vol. 12, No. 2; year 2000. (Year: 2000).*

(Continued)

*Primary Examiner* — Bernarr E Gregory
(74) *Attorney, Agent, or Firm* — Buchalter; Jason W. Croft

(57) ABSTRACT

A system comprises a first phased array radar assembly configured to be attached to a vehicle. The first phased array radar assembly includes a first plurality of antennas arranged in an array and attached to a circuit board. The system also includes one or more circuits attached to the circuit board. Each of the one or more circuits includes transmitter circuitry communicatively coupled to a subset of the first plurality of antennas and receiver circuitry communicatively coupled to the subset of the first plurality of antennas.

18 Claims, 10 Drawing Sheets

(56) References Cited

U.S. PATENT DOCUMENTS

| | | | |
|---|---|---|---|
| 7,019,682 B1* | 3/2006 | Louberg | G01S 7/03 |
| | | | 342/26 B |
| 8,305,259 B2 | 11/2012 | Margomenos | |
| 8,786,496 B2 | 7/2014 | Rida et al. | |
| 9,903,949 B2* | 2/2018 | Huang | G01S 13/931 |
| 10,126,421 B2 | 11/2018 | Ling | |
| 10,162,053 B2 | 12/2018 | Ling | |
| 10,175,352 B2 | 1/2019 | Ling | |
| 10,324,179 B2 | 6/2019 | Ling et al. | |
| 11,585,890 B2* | 2/2023 | Ling | G01S 13/931 |
| 2016/0349365 A1 | 12/2016 | Ling | |
| 2018/0269919 A1 | 9/2018 | Gharavi et al. | |
| 2018/0356506 A1 | 12/2018 | Bilik et al. | |

OTHER PUBLICATIONS

"Who We Are: Our Brands"; no author given; no date given; copyright in the year 2024; published by the Wi-Fi Alliance; Austin, Texas, USA; posted on the Internet at wi-fi.org. (Year: 2024).*
"Brand Guide for Bluetooth Trademarks"; no author given; Jun. 2022; published by the Bluetooth Special Interest Group; Kirkland, Washington, USA; posted on the Internet at bluetooth.com. (Year: 2022).*
U.S. Appl. No. 16/372,587, filed Apr. 2, 2019.
U.S. Appl. No. 16/372,595, filed Apr. 2, 2019.

* cited by examiner

PHASED ARRAY AUTOMOTIVE RADAR

PRIORITY CLAIM

This application is a continuation of U.S. patent application Ser. No. 16/372,600 titled "Phased Array Automotive Radar" filed on Apr. 2, 2019, now U.S. Pat. No. 11,585,890, which claims priority to U.S. Patent Application 62/651,357 titled "Phased Array Automotive Radar" filed on Apr. 2, 2018, each of which are hereby incorporated by reference in their entireties.

BACKGROUND

Limitations and disadvantages of conventional radar systems and methods will become apparent to one of skill in the art, through comparison of such approaches with some aspects of the present method and system set forth in the remainder of this disclosure with reference to the drawings.

BRIEF SUMMARY

Methods and systems are provided for phased array automotive radar, substantially as illustrated by and/or described in connection with at least one of the figures, as set forth more completely in the claims.

DETAILED DESCRIPTION

Figure 1A:
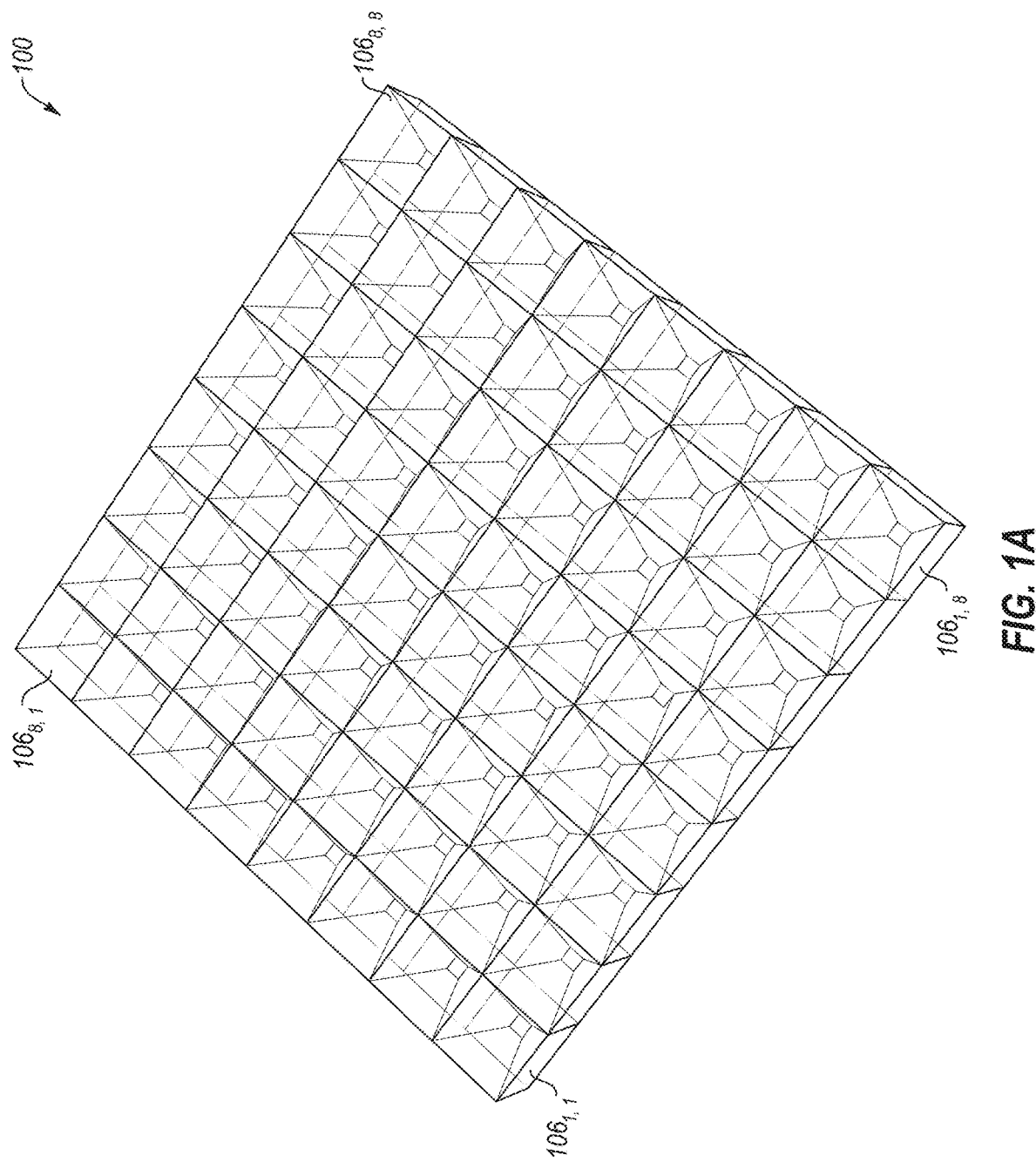
FIGS. 1A-1C show an example phased array system in accordance with an example implementation of this disclosure.
Figure 1B:
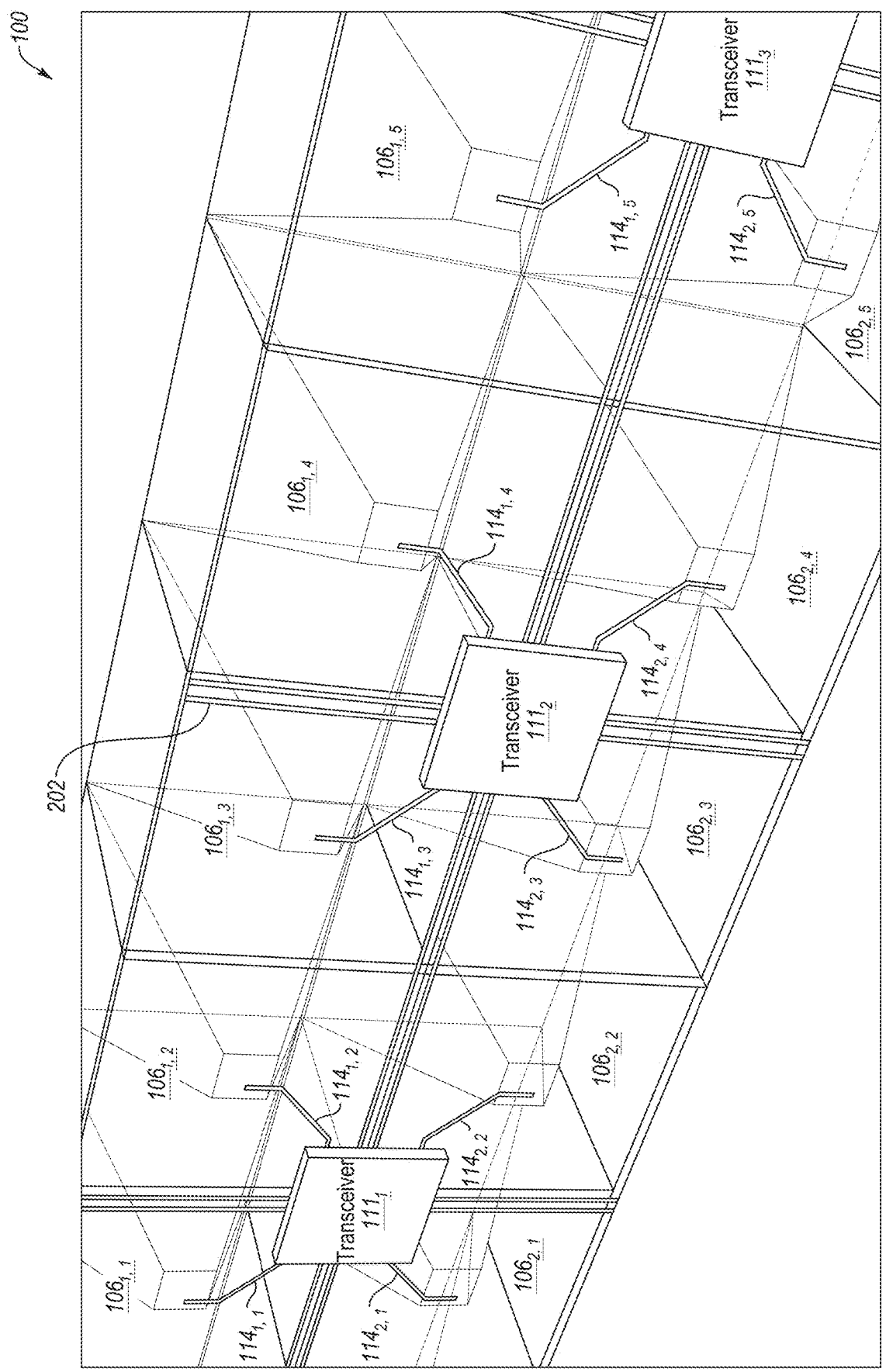
Figure 1C:
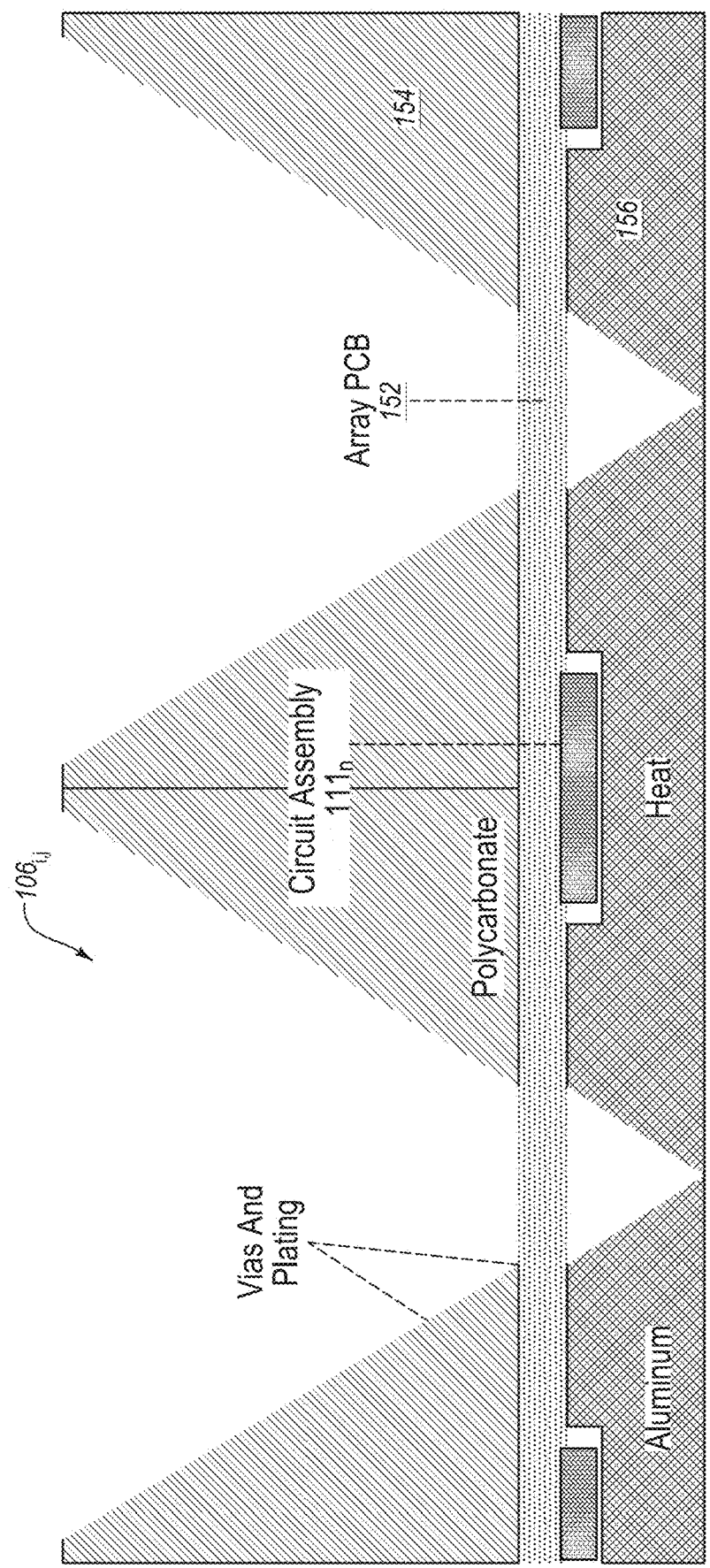

FIG. 1A-1C illustrate an example phased array system 100. FIG. 1A shows a front view and FIG. 1B shows a rear view.

The phased array system 100 comprises a plurality of antenna element elements arranged in a 2-dimensional array. Each antenna element is called out as $106_{i,j}$, where i is an integer corresponding to the antenna element's row index in the array ($0<=i<=I$) and j is an integer corresponding to the antenna element's column index in the array ($0<=j<=J$). In the example shown there are 8 antenna elements in each row and 8 antenna elements in each column, (i.e., I=8 and J=8), but in practice any number of antenna elements may be used. The transmission and reception of signals by the system 100 may take advantage of beamforming and may be particularly configured for addressing possible issues (interference, etc.) and/or to provide added features, as described below.

The example phased array system 100 of FIGS. 1A-1C comprises an array of N antenna element elements 106 (e.g., N=64 elements, in 8×8 arrangement, as shown in the non-limiting example implementation illustrated in FIG. 1A), and one or more circuits assemblies 111 for handling and/or supporting transmission and reception of signals via the array of antenna element elements 106. The circuit assemblies 111 are operable to perform various signal processing related functions, as well as (optionally) other functions (e.g., control, storage, etc.) in support of the transmission and reception of signals via the antenna elements 106. In the example implementation shown, the system 100 comprises N (an integer) circuit assemblies $111_n$ ($1<=n<=N$), each of which is operable to transmit and/or receive via a respective M (an integer) of the antenna elements 106 (N=16 and M=4 in the example shown).

As shown in the example implementation of FIG. 1C, antenna elements 106, of which two elements are shown in the cross-section slice depicted in FIG. 1C, the antenna elements 106 may be formed using carved horn structure 154, which may comprise polycarbonate (or other suitable material) substrate with conductive plating (e.g., aluminum) covering the surfaces forming the horn-shaped antenna elements. The antenna elements 106 may be mounted to a rigid base structure 156 (e.g., made of aluminum). In between the base structure 156 and the horn structure 154 may be one or more printed circuit board (PCB) 152 that provides RF traces interconnecting the circuit assemblies 111 and the antenna elements 106.

Phased array systems, such as the phased array system 100, offer various advantages and/or improvements over conventional antenna systems, such as dish-based designs. In this regard, because of their light weight, small form factor, and use of beam steering (e.g., beamforming), phased array systems are preferable over traditional dish-based designs. The elimination of dish and related components (e.g., the frequency duplexer, large power amplifier ("PA"), etc.) allows for installation at a wider range of sites, with lower cost of installation and operation (e.g., automatic alignment). Accordingly, phased array systems may be installed in a more flexible manner compared to dish-based designs, allowing installation options not possible or practical with traditional designs—e.g., mounting to sides of buildings, etc.

Phased array systems may have lower costs (e.g., fewer, smaller, and less expensive circuits, etc.). Also, the use of software-defined multiband array operation adds more flexibility. For example, the elimination of certain components (e.g., duplexers) allows the array-based systems to operate across a wide frequency range. Greater link reach may be achieved for the same dish size (due to, e.g., greater transmitter power, interference suppression, etc.). Operations may be improved (e.g., lower operating expenditures, greater frequency reuse, lower weight, etc.). Further, phased array systems may have superior thermal dissipation characteristics. In addition, the same core technology may be used for different interfaces and/or frequencies bands, allowing for common software and hardware development.

Figure 2A:
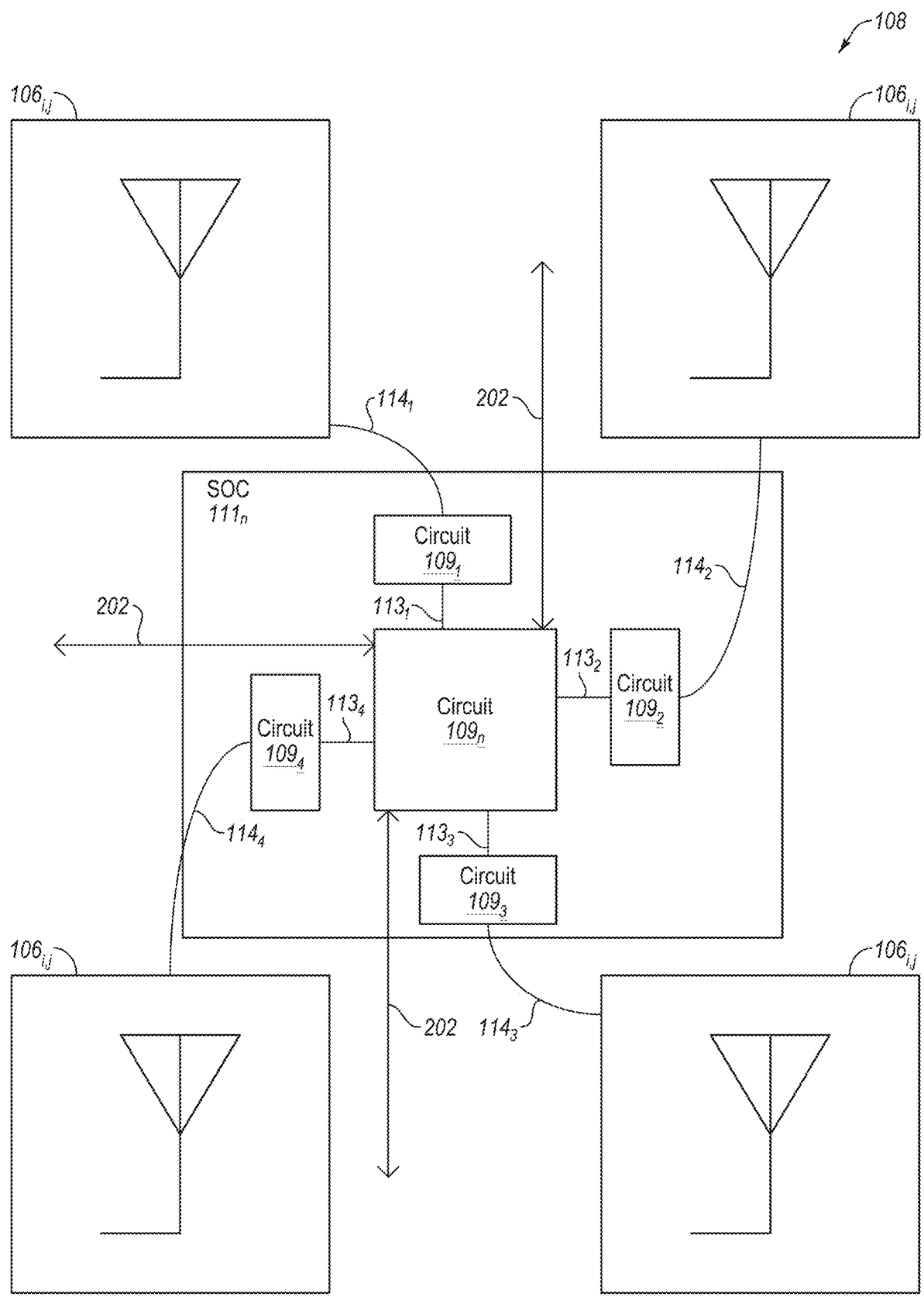
FIGS. 2A and 2B show an architecture of a phased array transceiver system in accordance with an example implementation of this disclosure.
Figure 2B:
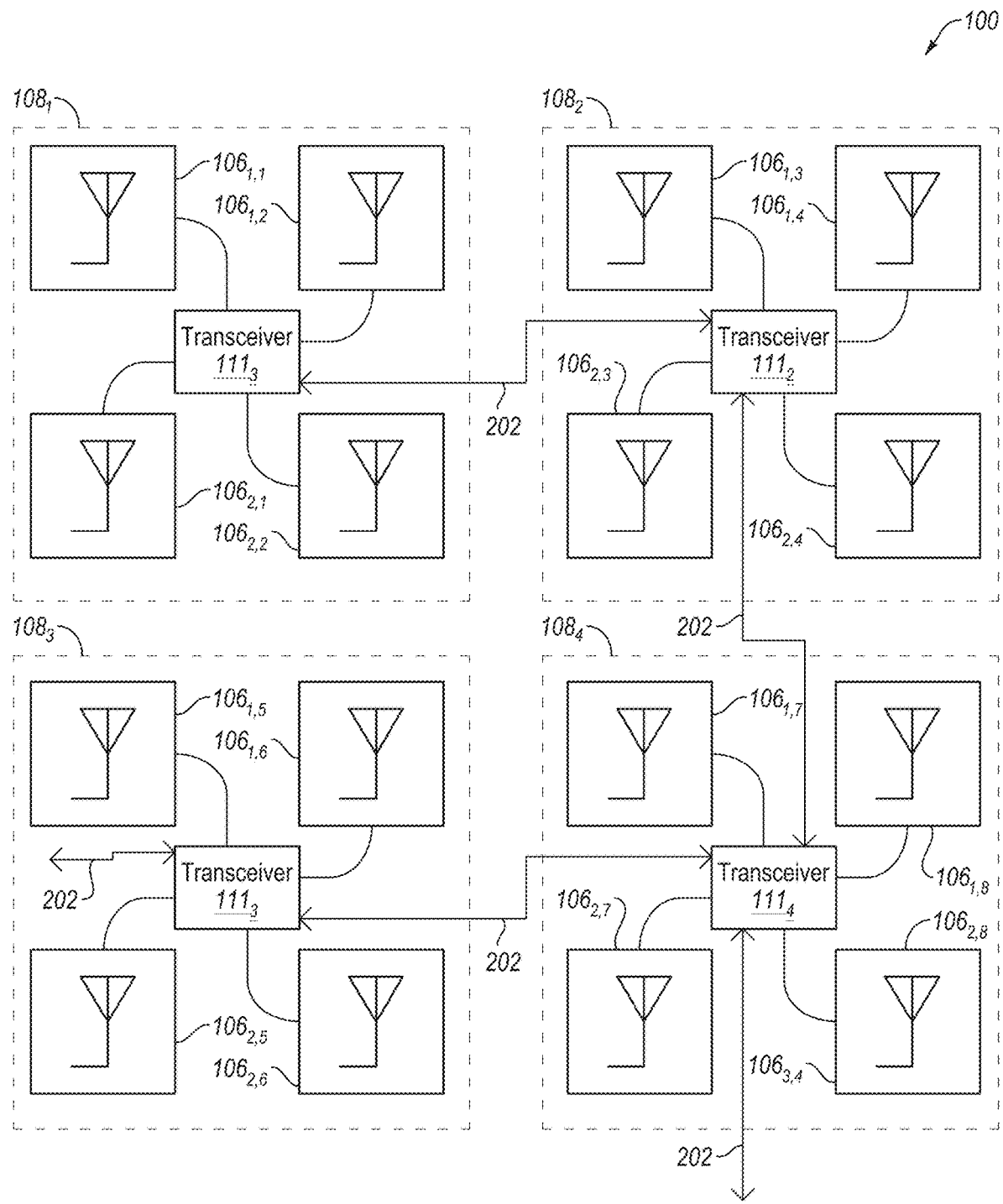

FIGS. 2A and 2B show an example architecture of a phased array transceiver system. In the example implementation of FIGS. 2A and 2B, each circuit assembly $111_n$ comprises a highly-integrated transceiver system on chip (SoC) $110_n$ and a plurality of off-chip circuits $109_m$, each of the circuits $109_m$ being associated with a respective one of the M antenna elements 106 via which the SoC $110_n$ transmits and/or receives. An example implementation of the SoC $110_n$ is described below with reference to FIG. 2C. An example implementation of the circuits 109 is described below with reference to FIG. 2C. The N SoCs $110_1$-$110_N$ are interconnected via interconnect 202, which may, for example, comprise a high-speed serial bus via which the SoCs $110_1$-$110_N$ can exchange data and control signaling.

In an example implementation, each circuit 111 is operable to: (1) transmit, in one or more desired directions using beamforming, millimeter wave signals (e.g., in the 76 to 81 GHz band) via its antenna elements 106; (2) receive reflections of the transmitted signal, from one or more desired directions using beamforming; and (3) process the received reflections to generate a representation of the "scene" on which the signals are incident. For example, the scene representation may be a voxel grid, with each voxel corresponding to a particular location in 4-Dimensional space (e.g., its GPS coordinates and time at which the coordinates were measured). Also, each voxel may have additional information associated with it such as, for example, a strength of the reflection, a spectrum of the reflection, a velocity of an object (e.g., car, pedestrian, etc.) located at the voxel, and/or a material composition (e.g., a quantification of how hard or soft) of an object located at the voxel.

Figure 2C:
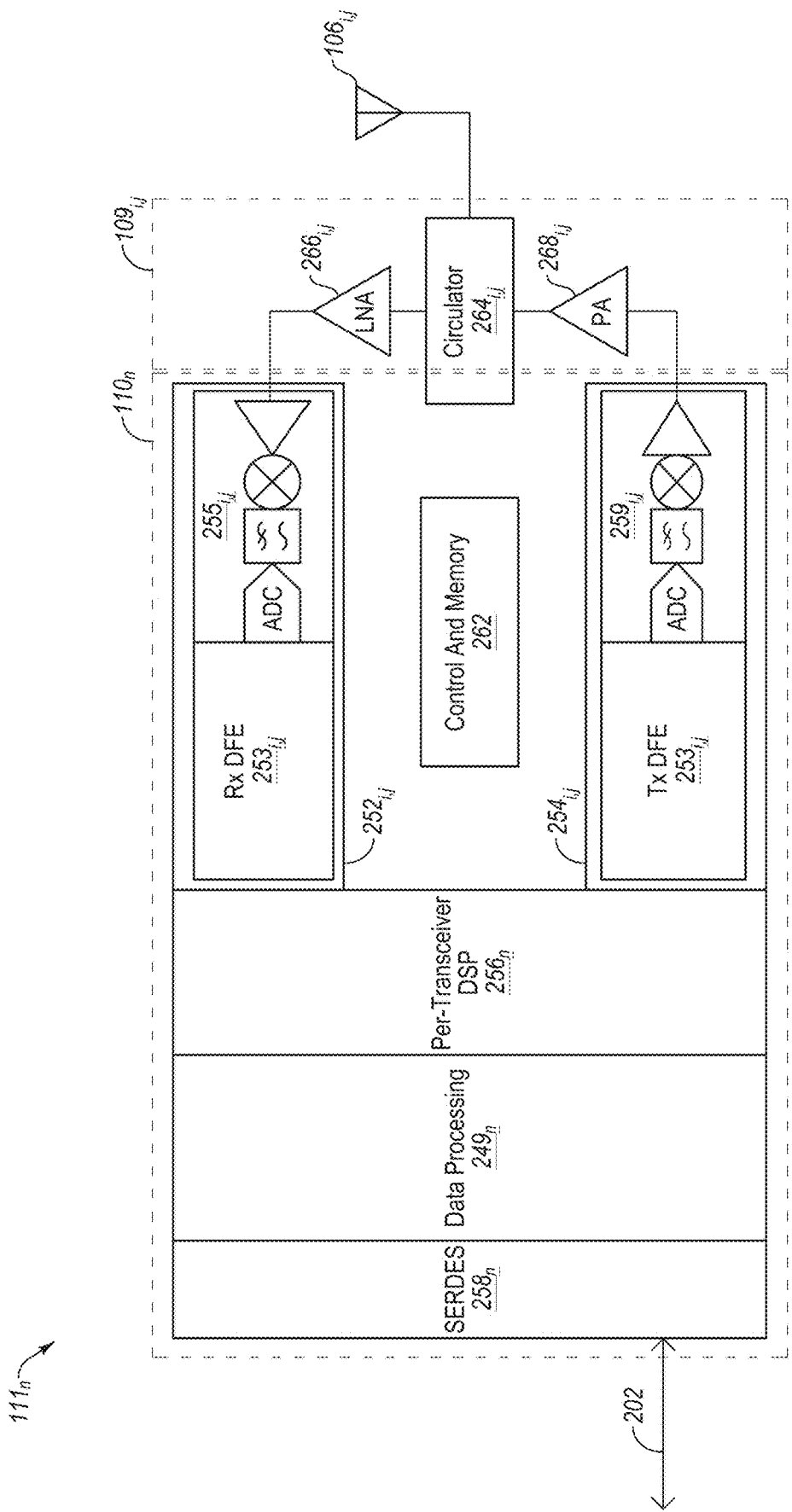
FIG. 2C shows an example implementation of a transceiver system on chip (SoC) suitable for use in a phased array radar system in accordance with an example implementation of this disclosure.

Shown in FIG. 2C are details of an example implementation of the SoC 110n and a circuit $109_{i,j}$. In an example implementation, the SoC 110n is a CMOS device and the LNA $266_{i,j}$ and PA $268_{i,j}$ are PHEMT devices. In other example implementations, one or more components of the circuits $109_{i,j}$ may be integrated on the CMOS chip $110_n$.

The example SoC $110_n$ comprises serialization and deserialization (SERDES) circuitry 258, per-transceiver digital signal processing (DSP) circuitry 256, one or more receive front-end circuits $252_{i,j}$, one or more transmit front-end circuits $254_{i,j}$, and a portion of one or more (four, in an example implementation) circulator $264_{i,j}$. Although only one receive front-end circuit $252_{i,j}$ and one transmit front-end circuit $254_{i,j}$ are shown for simplicity of illustration, the SoC $110_n$ may comprise any number of instances of these circuits. In the example implementations of FIGS. 1A, 1B, 2A, and 2B, for example, the SoC $110_n$ may comprise four instances of receive front-end circuit $252_{i,j}$—one for each of the four antenna elements $106_{i,j}$ via which the SoC $110_n$ receives, and four instances of transmit front-end circuit $254_{i,j}$—one for each of the four antenna elements $106_{i,j}$ via which the SoC $110_n$ transmits.

The example circuit $109_{i,j}$ comprises a low-noise amplifier $266_{i,j}$, a power amplifier $268_{i,j}$, and a portion of the circulator $264_{i,j}$. Although only one circuit $109_{i,j}$ is shown for simplicity of illustration, the circuit assembly $111_n$ may comprise any number of instances of this circuits. In the example implementations of FIGS. 1A, 1B, 2A, and 2B, for example, the circuit assembly $111_n$ may comprise four instances—one for each antenna $106_{i,j}$ via which the SoC $110_n$ transmits and/or receives.

Each of the receive front-end circuits $252_{i,j}$ comprises an analog front-end circuitry (AFE) $255_{i,j}$ and a digital front-end circuit (DFE) $253_{i,j}$ operable to process a millimeter wave signal (e.g., in the band from 76 to 81 GHz) from antenna elements $106_{i,j}$.

The processing by AFE $255_{i,j}$ may comprise, for example, low noise amplification, down-conversion, filtering, and analog-to-digital conversion by the AFE $255_{i,j}$ so as to output an intermediate frequency or digital baseband signal to the DFE For example, each Rx AFE $255_{i,j}$ may downconvert a received 76 to 77 GHz band to a 1-GHz-wide baseband signal which the corresponding ADC 254 may then digitize to generate a 1-GHz-wide digital signal. As another example, each Rx AFE $255_{i,j}$ may downconvert a received 76 to 81 GHz band to a 5 GHz wide baseband signal which the corresponding ADC 254 may then digitize to generate a 5-GHz-wide digital signal.

The processing by DFE $253_{i,j}$ may comprise, for example, channel estimation and equalization.

For received signals, the DSP circuit $256_n$ is operable to process the digitized signals from the plurality of DFEs $253_{i,j}$ to recover information conveyed by the received signals. Such information may be conveyed by characteristics (e.g., latency, Doppler shift, signal strength, etc.) of the received signals, as is the case in a conventional radar system, and/or may be data that was modulated onto the received signals. In an example implementation in which the millimeter wave signals are modulated by a data signal, the processing performed by the digital signal processing circuit $256_n$ may include demodulation. For example, the millimeter wave signals transmitted by circuit assembly 111 may comprise OFDM frames and each digital signal processing circuit $256_n$ may be operable to demodulate the received signals using a discrete Fourier transform. The digital signal processing circuit $256_n$ may then be operable to demap the modulated signal according to one or more symbol constellations, deinterleave the demapped bits, and decode the demapped bits. The recovered bits may then be provided to the control and memory subsystem 262 and/or to SERDES $258_{i,j}$ for output onto the bus 212.

Received signal processing by DSP $256_n$ may comprise, for example, applying a determined phase shift to the signals received from each DFE $253_{i,j}$ and then combining the signals so as to achieve the desired beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

Received signal processing performed by the digital signal processing circuit $256_n$ may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected).

Received signal processing performed by the digital signal processing circuit 256 may comprise separating different signals (e.g., originating from different ones of the transceivers $111_1$-$111_N$). The may comprise, for example, correlating the received signals with different orthogonal codes and/or pseudorandom sequences used by different ones of the transceivers $111_1$-$111_N$. Alternatively, or additionally, separating different transmitted signals (e.g., to determine which transceiver $111_n$ sent which signal) may comprise directly recovering a respective identifier (e.g., a unique identifier such as a MAC address or similar) modulated onto each of the millimeter wave signals. The ability to distinguish which, if any, energy arrived from each transceiver $111_1$-$111_N$ may be useful for performing radar, positioning, and communication functions. For the radar and positioning functions, for example, the identification of which of transceivers $111_1$-$111_N$ sent any particular received signal may be used for determining the position and angle from which the signal was transmitted (since the different transceivers $111_1$-$111_8$ are at different positions in the array 100), which may be used for determining precise distance to, and location of, objects in the scene. For the communication function, for example, the identification of which of transceivers $111_1$-$111_N$ sent any particular received signal may be used in a manner similar to a "from" address in many networking protocols.

The data processing circuitry $249_n$ is operable to process data output by the digital signal processing circuitry $256_n$. Such processing may comprise, for example, implementing algorithms to generate a representation of the scene detected using the radar function. Based on the angle, strength, timing, spectral content, and/or other characteristics of the received signals, the data processing circuitry $249_n$ may generate a 2D pixel grid or 3D voxel grid. In an example implementation, each pixel or voxel may indicate an absolute position to which it corresponds, the strength of returns, if any, received from that location, spectral content of returns, if any, received from that location, time(s) at which returns were received from that location, and/or at which the pixel or voxel data was updated.

The data processing circuitry $249_n$ may also be operable to process data received from the data bus 202. For example, positioning information may be received via the bus 202 (e.g., GPS coordinates from a GPS receiver) and combined with data recovered from the digital processing circuitry $249_n$ for performing a positioning function.

The processing performed by data processing circuitry $249_n$ of data output by digital signal processing circuitry 256 may comprise, for example, preparing data for output onto the data bus 202. For example, a scene representation generated from the output of the digital signal processing circuitry 256 may be transmitted onto the data bus 202.

Each of the Tx AFEs $259_{i,j}$ is operable to receive a digital baseband signal from Tx DFE $257_{i,j}$, convert the signal to analog, upconvert the signal to a millimeter wave (e.g., a 1 GHz to 5 GHz wide signal in the band from 76 to 81 GHz), and amplify the millimeter wave signal for output to antenna element $106_{i,j}$.

For transmit, the digital signal processing circuitry $256_n$ is operable to process one or more data streams from data processing circuitry $249_n$ to generate a plurality (four in the example shown) of digital baseband signals. Transmit processing performed by digital signal processing circuitry $256_n$ may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The transmit processing performed by the digital signal processing circuit $256_n$ may comprise generating modulated signals to be modulated onto one or more carriers. For example, the digital signal processing circuit $256_n$ may output an OFDM signal.

The transmit processing performed by the digital signal processing circuit $256_n$ may comprise beamforming. The beamforming may comprise time-domain beamforming and/or frequency-domain beamforming.

Transmit operations performed by the data processing circuit $249_n$ may comprise generating one or more data signals for modulation onto the millimeter wave signals transmitted by the transceiver $111_n$. The datastreams may, for example, be read from memory of the transceiver $111_n$ (e.g., an identifier of the module $111_n$) and/or generated algorithmically (e.g., timestamps generated based on a clock of the control portion of subsystem 262). Additionally, or alternatively, the data may be received from bus 202 via bus controller $258_n$. The data processing circuit $249_n$ may packetize and/or otherwise format the data.

The bus controller circuitry $258_n$ is operable to relay data between the data bus 202 and the circuitry of the SoC $110_n$. The bus 202 may, for example, be a high speed serial bus in which case the bus controller circuitry $258_n$ is operable to perform serialization and deserialization for communicating over the bus 202.

The control portion of subsystem 262 is operable to manage operations of the SoC $110_n$ (e.g., implement a state machine and/or other control logic that controls the configuration of the other components of the receive transceiver $111_n$). The control portion of subsystem 262 may, for example, configure beamforming matrices used by the digital signal processing circuitry $256_n$. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications that are expected to come from that direction. Directions of interest may be determined based on, for example, data received via the data bus 202, data carried in previously received millimeter wave signals, and/or scene representations generated from previously received signal reflections.

The memory portion of subsystem 262 is operable to store relatively large amounts (e.g., hundreds of megabits) of information of a variety of forms. For example, beamforming matrices, an identifier of the transceiver $111_n$, scrambling codes, and messages received from and/or to be communicated to (via data bus 202 and/or via millimeter wave signals) other transceivers $111_n$ are just some examples of the information which may be stored in the memory and readily accessible to the transceiver $111_n$.

Figure 3:
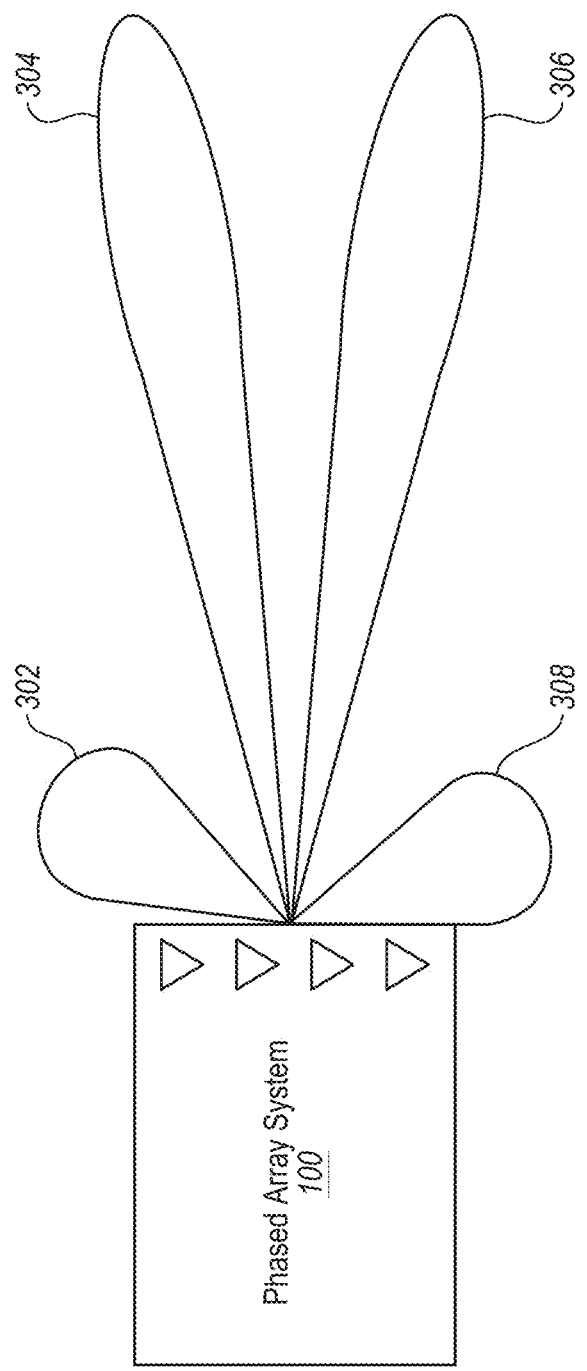
FIG. 3 shows an example antenna pattern of phased array radar system in accordance with an example implementation of this disclosure.

FIG. 3 shows an example antenna pattern of phased array radar system. In the example shown, for desired lobes—302, 304, 306, and 308 are formed. For example, lobes 302 and 308 may be used for identifying objects that are relatively close and off to the side of the phased array system 100, and the lobes 304 and 306 may be used for looking further in the distance (e.g., in the direction of travel of automobile to which the phased array is mounted). As another example, the lobes 302 and 308 may receive returns from the nearby road surface and the Doppler of such returns may be used for calculating the speed of the phased array (i.e., of the automobile to which it is mounted). As another example, lobes 302 and 308 may be used for directly communicating with another phased array system 100 off to the side of the depicted phased array system 100 (e.g., where multiple phased arrays system 100 are mounted to a single vehicle), and lobes 304 and 306 may be used for communicating with other transceivers by bouncing the signals off of objects in the scene.

Although four beams/lobes are shown for illustration, the phased array radar system is not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 302, 304, 306, and 308 may change periodically, based on what is detected in the scene, based on desired communication to be sent or received, and/or the like.

Figure 4A:
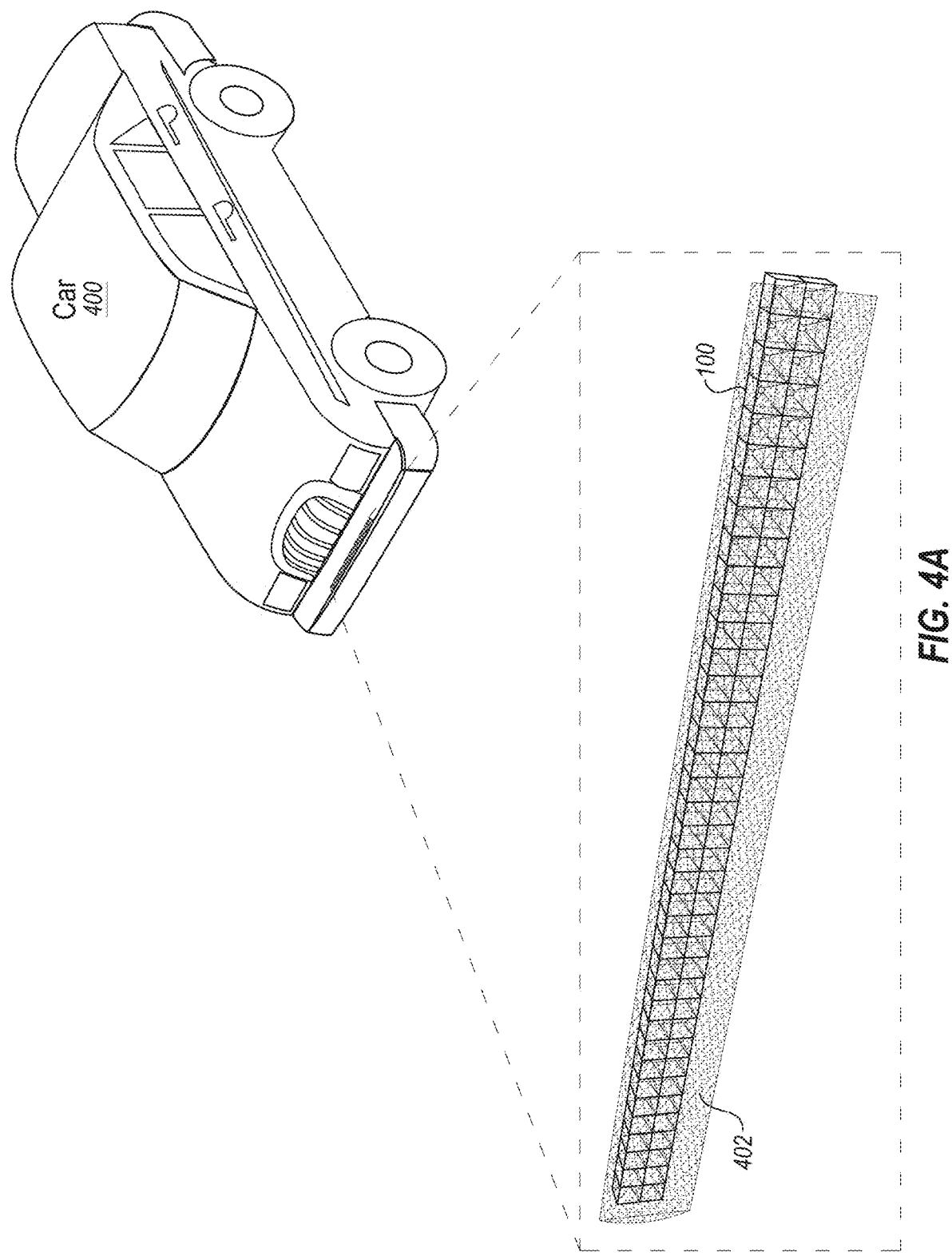
FIG. 4A shows an example phased array radar system integrated into an automobile in accordance with an example implementation of this disclosure.

FIG. 4A shows an example phased array radar system integrated into an automobile. A 2×64 element antenna array is placed in/behind the bumper of the automobile 400. In the example implementation the array comprises a lens 402 that further controls the directionality of the antenna.

Figure 4B:
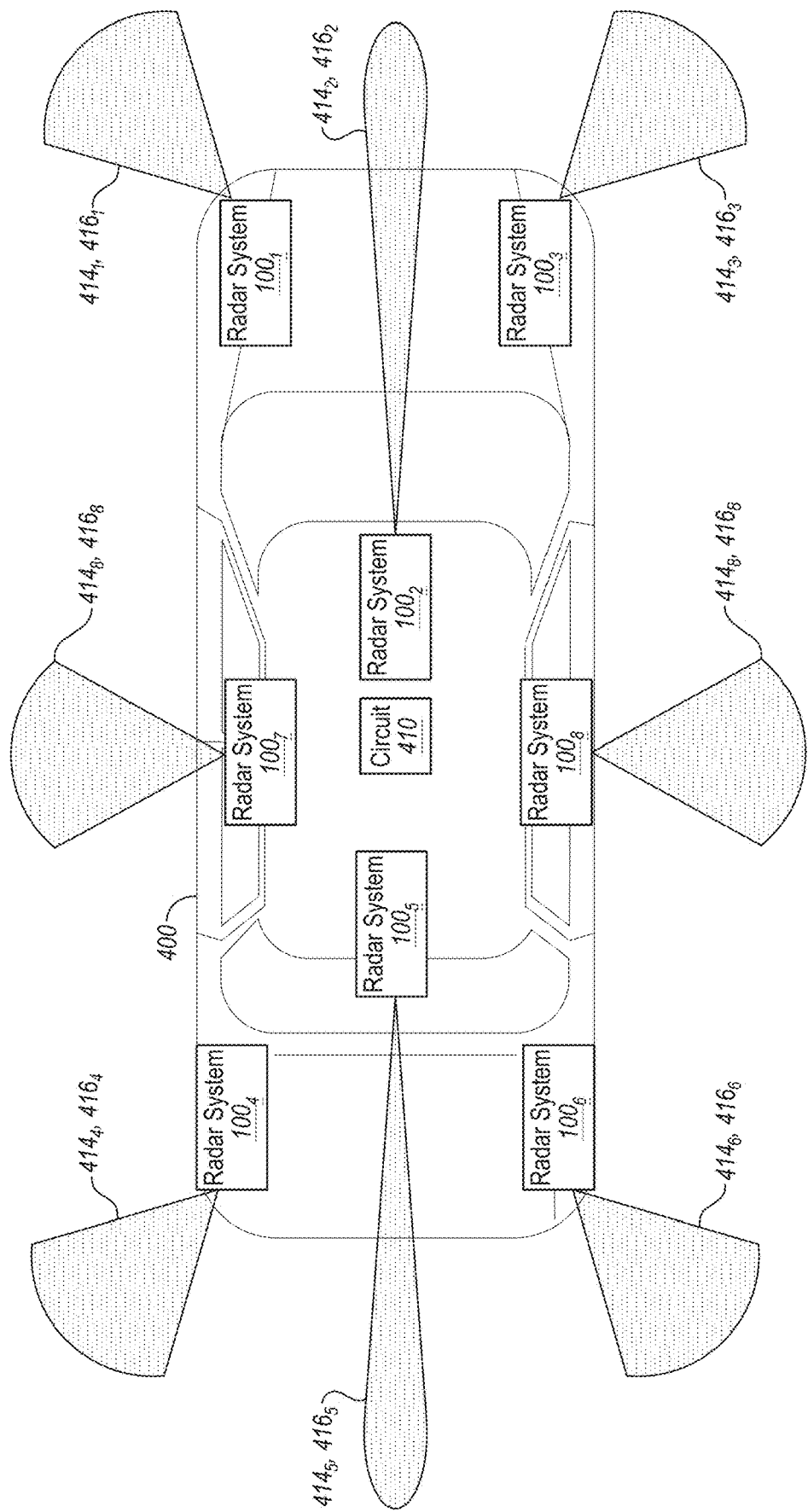
FIG. 4B shows an automobile comprising a plurality of phased array radar systems in accordance with an example implementation of this disclosure.

FIG. 4B shows an automobile 400 comprising a plurality of phased array radar systems 100 (labeled with subscripts '1' through '8'). Although the example automobile 400 comprises eight phased array radar systems 100 for illustration, any number may be present. Each phased array radar system 100 has a corresponding receive antenna pattern 414 and transmit antenna pattern 416 (for clarity of illustration, the transmit and receive patterns are shown as the same, but they need not be). Each phased array radar system 100 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 400 (the "scene").

The positioning function comprises use of the same millimeter wave signals used for the radar function to improve upon coarse position determined through other mechanisms such as GPS.

The communication function comprises communicating data among the phased array radar systems 100 using the same millimeter wave signals as are used for the radar function. Such data may include, for example, pixel or voxel data (and time and position metadata) generated using the radar and positioning functions.

Through a combination of the radar function, the positioning function, and the communication function, the phased array radar systems 100 are operable to generate a scene representation (e.g., 2D pixel grid or 3D voxel grid) where the absolute time of capture of the scene representation and the absolute position of the pixels (2D) or voxels (3D) in the scene representation are known.

The circuitry 410 represents other circuitry of the automobile 400 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 410 may be communicatively coupled to the phased array radar systems 100 via a CANbus, for example. The circuitry 410 may be operable to process data from the phased array systems $100_1$-$100_8$ and take action (e.g., trigger driver alerts, transmit messages via one or more of its transceivers, trigger braking or other safety systems, etc.) in response to such data. The circuitry 410 may also generate data which it may pass to the phased array systems $100_1$-$100_8$ for communication to a remote phased array radar system 100 (e.g., that is mounted to another automobile and/or to infrastructure such the road, sign post, stop-light, etc.) In an example implementation the circuitry 410 may comprise a cell phone that connects to an electronics system of the automobile 400 via USB, Bluetooth, Wi-Fi, or any other suitable interface and then the electronics system 410 of the automobile 400 leverages the cellular transceiver of the circuitry 410 for connecting to a cellular network.

Figure 4C:
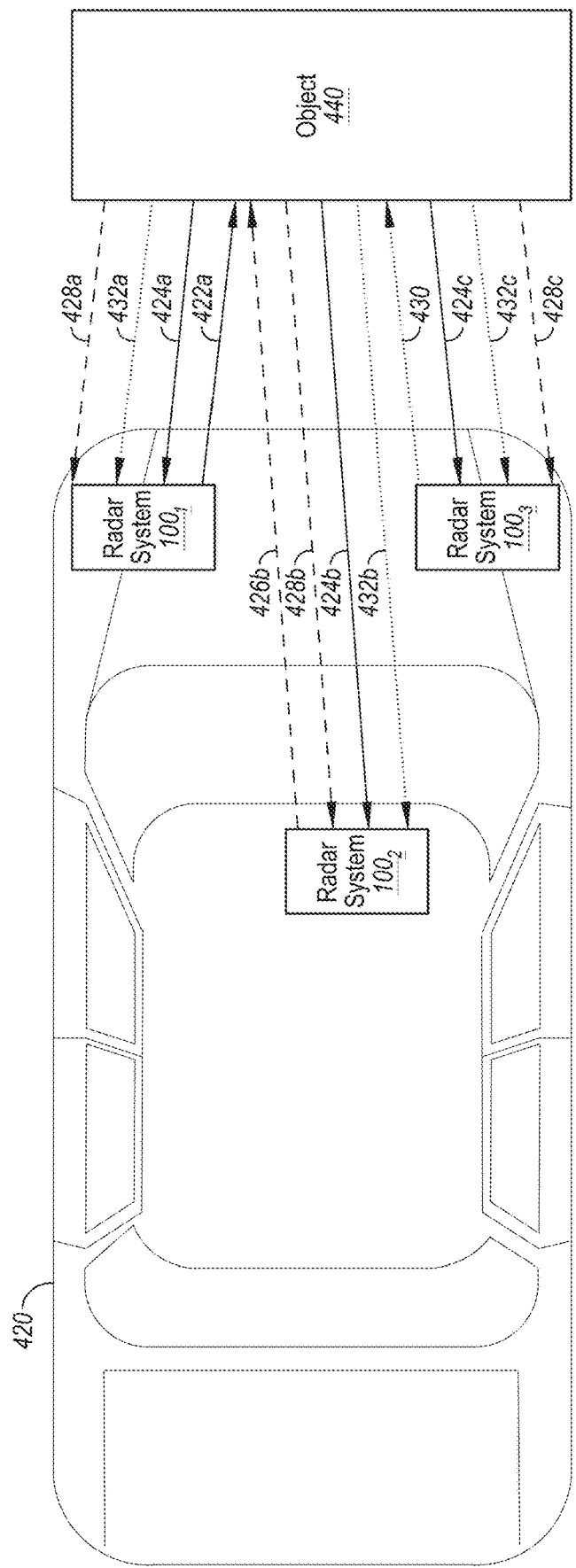
FIG. 4C shows example operation of a phased array radar system.

FIG. 4C shows example operation of a phased array radar system. The radar system $100_1$ transmits millimeter wave signal 422 which reflects off of object 440 (e.g., the car in front of the automobile 400) and is then received as signal 424a by radar system $100_1$, signal 424b by radar system $100_2$, and signal 424c by radar system $100_3$. The radar system $100_2$ transmits millimeter wave signal 426 which reflects off of object 440 and is then received as signal 428a by radar system $100_1$, as signal 428b by transceiver $100_2$, and as signal 428c by radar system $100_3$. The radar system $100_3$ transmits signal 430 which reflects off of object 440 and is then received as signal 432a by radar system $100_1$, as signal 432b by radar system $100_2$, and as signal 432c by radar system $100_3$.

As discussed above, each of the radar systems $100_1$, $100_2$, and $100_3$ may be operable to separate its respective received signals. That is, radar system $100_1$ can distinguish between energy of signal 424a, energy of signal 428a, and energy of signal 432a. Similar can be said for each of radar systems $100_2$ and $100_3$. This separation may be possible because, for example, the signals 422, 426, and 430 are frequency division multiplexed, time division multiplexed, spatially multiplexed, and/or code division multiplexed. Coordination for carrying out such multiplexing may be achieved as a result of, for example: factory settings of the three radar systems $100_1$, $100_2$, and $100_3$; passing control/coordination information among the radar systems $100_1$, $100_2$, and $100_3$ via the data bus 202; passing control/coordination information among the radar systems $100_1$, $100_2$, and $100_3$ via the millimeter wave signals 422, 426, 430, and/or the like.

While the present disclosure specifically addresses aspects of the invention in connection with an automobile, the disclosure contemplates that aspects of the invention may be used in connection with any type of vehicle or mobile machinery.

In accordance with an example implementation of this disclosure, a system comprises a first phased array radar assembly (e.g., $100_1$) configured to be attached to an automobile. The first phased array radar assembly comprises a first plurality of antennas (e.g., $106_{1,1}$ to $106_{2,8}$) arranged in an array and attached to a circuit board (e.g., 152). The system also comprises one or more circuits (e.g., $111_1$) attached to the circuit board. Each of the one or more circuits comprises transmitter circuitry (e.g., $254_{1,1}$ to $254_{2,2}$ and portions of $256_1$ and $249_1$) communicatively coupled to a subset of the first plurality of antennas (e.g., $106_{1,1}$ to $106_{2,2}$) and receiver circuitry (e.g., $252_{1,1}$ to $252_{2,2}$ and portions of $256_1$ and $249_1$) communicatively coupled to the subset of the first plurality of antennas. The one or more circuits may comprise a first circuit (e.g., $111_1$) and a second circuit (e.g., $111_2$), where the first circuit is communicatively coupled to the second circuit via interconnect (e.g., 202) of the circuit board. The first circuit may be communicatively coupled to the first subset of the first plurality of antennas, the second circuit may be communicatively coupled to a second subset of the first plurality of antennas. The first circuit may operable to transmit a signal via the first subset of the antennas using a first one or more beamforming coefficients (e.g., corresponding to a first directionality of a primary antenna lobe), receive reflections of the signal via the first subset of the first plurality of antennas using the first one or more beamforming coefficients, and generate a first representation (e.g., pixel or voxel grid) of a scene based on the reflections of the signal. The second circuit may be operable to transmit the signal via the second subset of the first plurality of antennas using a second one or more beamforming coefficients (e.g., corresponding to the first directionality of a primary antenna lobe), receive reflections of the signal via the second subset of the antennas using the second one or more beamforming coefficients, and generate a second representation of the scene based on the reflections of the signal. The first circuit may be operable to send the first scene representation to the second circuit (e.g., via 202), and the second circuit may be operable to combine the first scene representation and the second scene representation to generate an aggregate scene representation. The first plurality of antennas may be formed (e.g., cast or molded) from a single-piece substrate. Each of the first plurality of antennas may be a horn antenna (e.g., rectangular or conical). The substrate may be a non-conductive material (e.g., polycarbonate) plated with a conductive material. The array may be a two-dimensional array. The one or more circuits may comprise beamforming circuitry (e.g., $256_1$) operable to steer a transmit radiation pattern and/or receive radiation pattern in two dimensions. The first phased array radar assembly may be attached on or behind a bumper of the automobile such that the phased array radar assembly is positioned to transmit signals in a direction of travel of the automobile and receive reflections of the signals. The system may comprise a second phased array radar assembly (e.g., $100_2$) configured to be attached to an automobile, wherein the second phased array radar assembly comprises: a second plurality of antennas (e.g., $106_{1,1}$-$106_{2,8}$) arranged in an array and attached to a circuit board (e.g., 152); and one or more circuits (e.g., $111_1$) attached to the circuit board, wherein each of the one or more circuits comprises: transmitter circuitry (e.g., $254_{1,1}$ to $254_{2,2}$ and portions of $256_1$ and $249_1$) communicatively coupled to a subset of the second plurality of antennas, and receiver circuitry (e.g., $252_{1,1}$ to $252_{2,2}$ and portions of $256_1$ and $249_1$) communicatively coupled to a subset of the second plurality of antennas. The first phased array radar assembly and the second phased array radar assembly may be operable to communicate wirelessly via the first plurality of antennas and the second plurality of antennas. The first phased array radar system and second phased array radar system may be mounted to the automobile in different locations (e.g., like $100_1$ and $100_2$) and may be pointed in different directions. The transmit circuitry may be operable to transmit a signal comprising one or more orthogonal frequency division multiplexed (OFDM) frames, and the receive circuitry may be operable to receive and process reflections of the signal comprising the one or more OFDM frames to detect objects (e.g., 440) off of which the signal reflected. The first plurality of antennas may be attached to a first side of the circuit board and the one or more circuits may be attached to a second side of the circuit board opposite the first side.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system, comprising:
 a first phased array radar assembly, wherein the first phased array radar assembly comprises:
  a first plurality of antennas arranged in an array;
  one or more circuits, wherein each of the one or more circuits comprises:
   receiver circuitry communicatively coupled to the first plurality of antennas,
    the one or more circuits being operable to receive a signal via at least one of the first plurality of antennas, the signal being indicative of a characteristic of an environment, where the signal is used by a processor to generate a multidimensional representation of a scene based on the characteristic of the environment, wherein at least one of the one or more circuits includes or is coupled to at least one digital signal processor (DSP) operable to:
apply a phase shift on the signal; and
combine the phased shifted signal with a second signal to achieve beamforming.

2. The system of claim 1, wherein the signal includes a reflection.

3. The system of claim 1, wherein at least one of the one or more circuits includes or is coupled to at least one low-noise amplifier (LNA).

4. The system of claim 1, wherein at least one of the one or more circuits includes or is coupled to at least one power amplifier (PA).

5. The system of claim 1, at least one of the one or more circuits includes transmitter circuitry, the receiver circuitry and the transmitter circuitry forming a first transceiver, the at least one DSP being dedicated to the first transceiver.

6. The system of claim 1, wherein at least one of the one or more circuits includes or is coupled to at least a portion of a circulator.

7. The system of claim 1, further comprising a second phased array radar assembly comprising a second plurality of antennas operable to communicate wirelessly with the first plurality of antennas of the first phased array radar assembly.

8. The system of claim 7, the second plurality of antennas coupled to a second transceiver.

9. The system of claim 7, the first phased array radar assembly being pointed in a first direction, the second phased array radar assembly being pointed in a second direction.

10. The system of claim 9, the first direction being different than the second direction.

11. The system of claim 9, the first phased array radar assembly being configured to mount to a vehicle in a first location, the second phased array radar assembly being configured to mount to the vehicle in a second location.

12. The system of claim 11, the first location being at a first end of the vehicle, the second location being either at a second end of the vehicle or a side of the vehicle.

13. The system of claim 1, the scene including at least an environmental representation of a three-dimensional space.

14. The system of claim 13, the scene including at least two objects detected by the system in the three-dimensional space.

15. The system of claim 1, further comprising circuitry operable to process a millimeter wave signal received by at least one antenna of the first plurality of antennas.

16. The system of claim 15, the millimeter wave signal being in a band from 76 to 81 gigahertz (GHz).

17. The system of claim 1, the signal including an analog signal.

18. The system of claim 1, the multidimensional representation of a scene including at least one point in space.

* * * * *